(12) United States Patent
Hinque et al.

(10) Patent No.: US 8,156,978 B1
(45) Date of Patent: Apr. 17, 2012

(54) TIRE AND SELF-INFLATION APPARATUS ASSEMBLY

(75) Inventors: Daniel Paul Luc Marie Hinque, Habay-la-Neuve (BE); Jean Joseph Victor Collette, Arlon (BE); René Louis Bormann, Moesdorf (LU); Massimo Di Giacomo Russo, Olm (LU); Gilles Bonnet, Niederfeulen (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 71 days.

(21) Appl. No.: 12/906,179

(22) Filed: Oct. 18, 2010

(51) Int. Cl.
*B60C 25/00* (2006.01)

(52) U.S. Cl. ........................ 152/426; 152/419

(58) Field of Classification Search .......... 152/418–419, 152/423–426
See application file for complete search history.

(56) References Cited

U.S. PATENT DOCUMENTS

| | | | | |
|---|---|---|---|---|
| 638,628 A | * | 12/1899 | Everett et al. ................. | 152/425 |
| 1,050,886 A | * | 1/1913 | Wetherell ....................... | 152/426 |
| 1,134,361 A | * | 4/1915 | Wetherell ....................... | 152/426 |
| 2,908,313 A | | 10/1959 | Pfeiffer | |
| 3,304,981 A | * | 2/1967 | Sheppard ....................... | 152/426 |
| 7,225,845 B2 | | 6/2007 | Ellmann ........................ | 152/426 |
| 8,042,586 B2 | * | 10/2011 | Losey et al. ................... | 152/426 |
| 8,113,254 B2 | * | 2/2012 | Benedict ........................ | 152/426 |
| 2009/0229358 A1 | | 9/2009 | Jongsma et al. ................ | 73/146 |
| 2009/0294006 A1 | * | 12/2009 | Hrabal ........................... | 152/426 |
| 2010/0243121 A1 | | 9/2010 | Eigenbrode .................... | 152/419 |

* cited by examiner

*Primary Examiner* — Jason Bellinger
(74) *Attorney, Agent, or Firm* — Richard B. O'Planick

(57) ABSTRACT

An air passageway body resides within a tire body and extends between an outward facing tire body surface and the tire cavity, the air passageway body having an enclosed air passageway extending between a hollow body outlet end facing the tire cavity and a hollow inlet end facing outward from the outward facing tire body surface. A tapping device is affixed over one or both of the ends of the air passageway body, the tapping device having an external vent opening and a protrusion member penetrating through a sidewall of the air passageway body to operatively establish an air flow path extending between the air passageway of the air passageway body through the protrusion member and the tapping device vent opening. The air passageway body is installed pre-cure within a green tire carcass build of the tire body and the tapping device(s) are attached post-cure to the air passageway body.

19 Claims, 12 Drawing Sheets

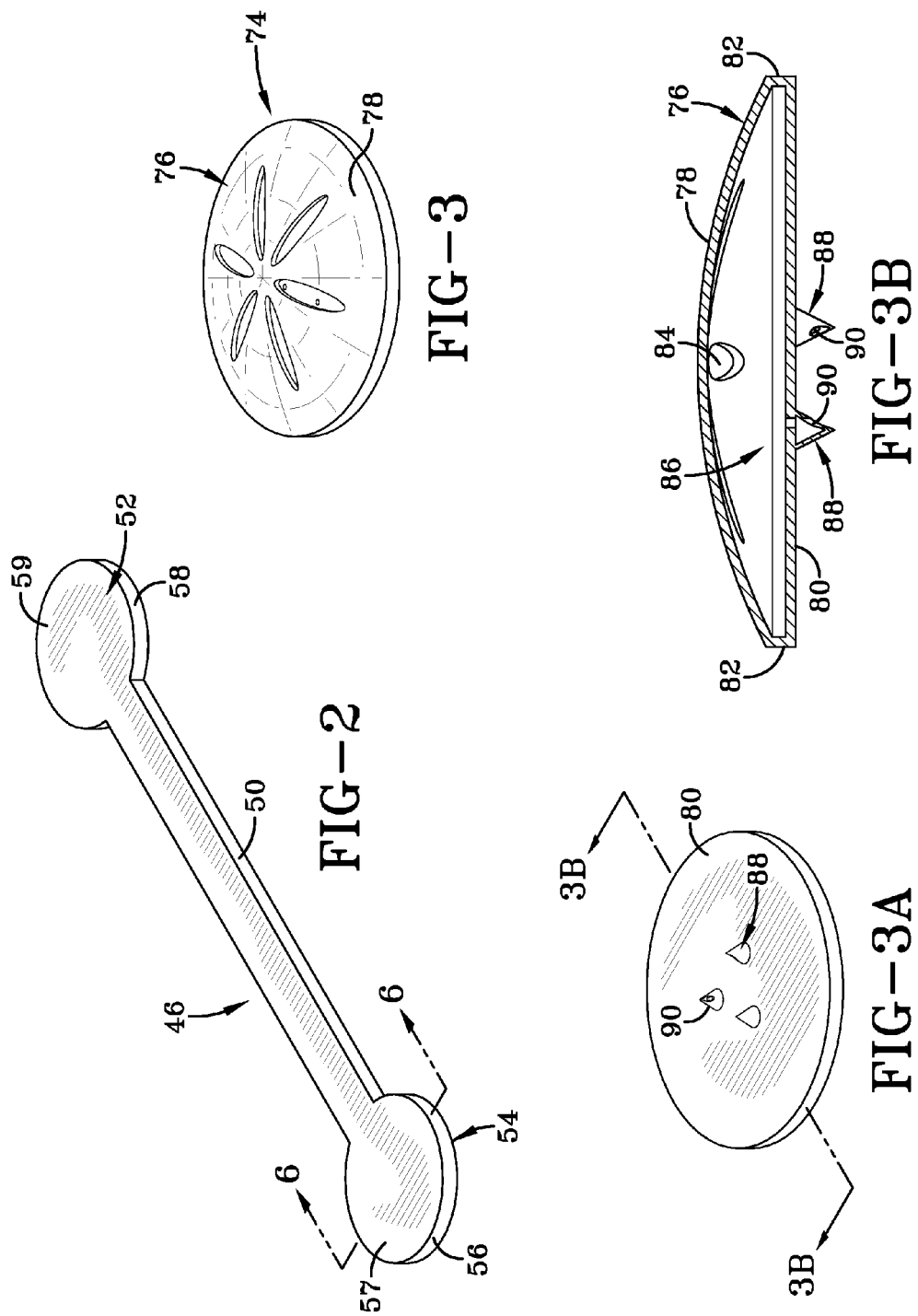

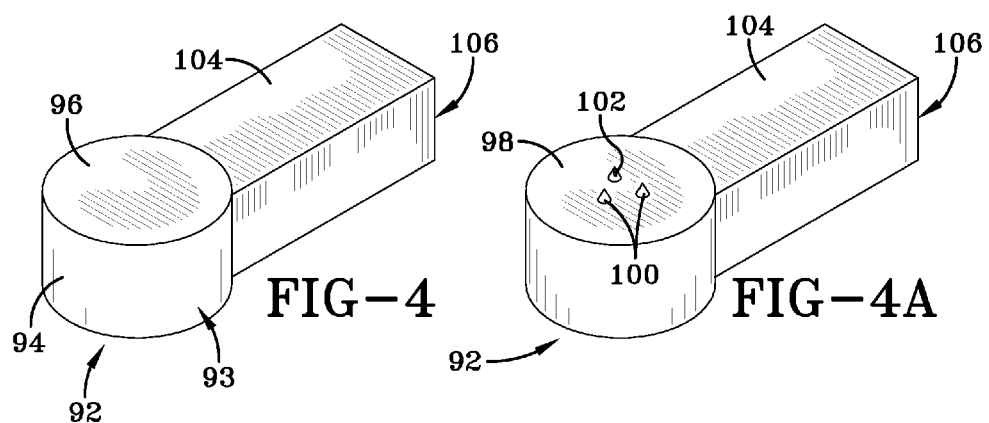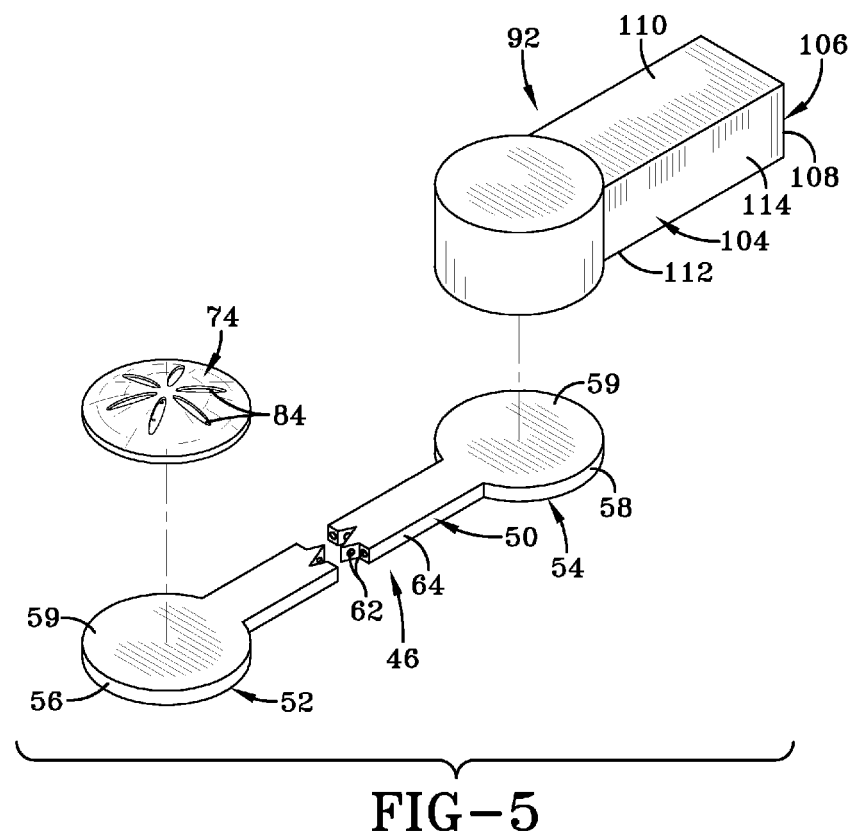

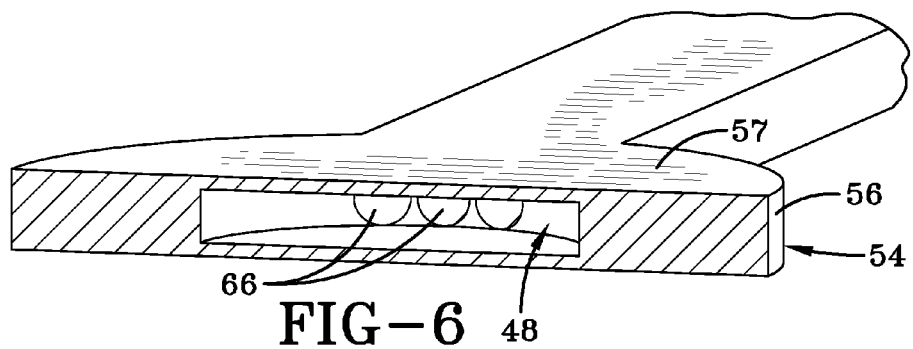
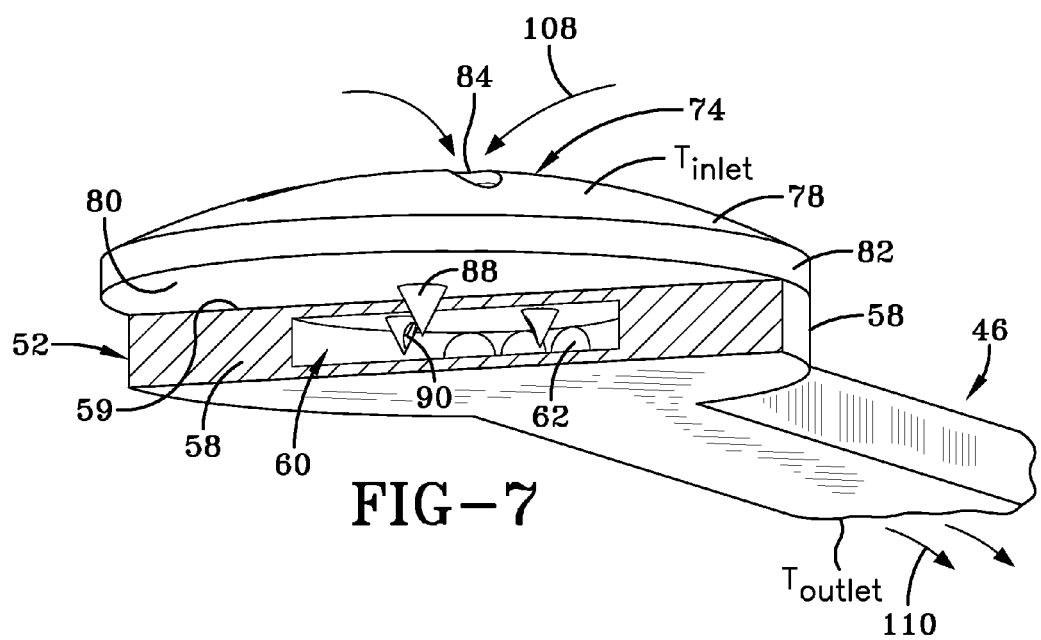

TIRE AND SELF-INFLATION APPARATUS ASSEMBLY

FIELD OF THE INVENTION

The invention relates generally to self-inflating tires and, more specifically, to a tire and self-inflation apparatus assembly.

BACKGROUND OF THE INVENTION

Normal air diffusion reduces tire pressure within a tire over time. The natural state of tires is under inflated. Accordingly, drivers must repeatedly act to maintain tire pressures or they will see reduced fuel economy, tire life and reduced vehicle braking and handling performance. Tire Pressure Monitoring Systems have been proposed to warn drivers when tire pressure is significantly low. Such systems, however, remain dependant upon the driver taking remedial action when warned to re-inflate a tire to recommended pressure. It is a desirable, therefore, to incorporate a self-inflating feature within a tire that will self-inflate the tire in order to compensate for any reduction in tire pressure over time without a need for driver intervention.

SUMMARY OF THE INVENTION

In one aspect of the invention, a tire assembly includes a tire body having a tire cavity between first and second sidewalls that extend respectively from a pair of annular tire core bead cores to a tire tread region. The tire body is constructed from a pre-cure green tire carcass cured to form a post-cure finished tire body. An air passageway body resides within the tire body and extends between an outward facing tire body surface and the tire cavity, the air passageway body having an enclosed air passageway extending between a hollow body outlet end facing the tire cavity and a hollow inlet end facing outward from the outward facing tire body surface. A tapping device is affixed over one or both of the ends of the air passageway body, the tapping device having an external vent opening and a protrusion member penetrating through a sidewall of the air passageway body to operatively establish an air flow path extending between the air passageway of the air passageway body through the protrusion member and the tapping device vent opening.

In another aspect, the tire assembly includes an inlet tapping device affixed over the hollow body inlet end to operatively direct air flow into the air passageway of the air passageway body and an outlet tapping device affixed over the hollow body outlet end to operatively direct air flow from the air passageway of the air passageway body into the tire cavity. The inlet tapping device and the outlet tapping device are preferably equipped with one or more hollow pin protrusions to attach the devices to respective ends of the air passageway body as well as to establish an air flow path from the air passageway of the air passageway body through the pin protrusions to the respectively attached tapping devices.

According to a further aspect, the air passageway body is installed pre-cure within the green tire carcass form of the tire body and the inlet tapping device and the outlet tapping device are attached post-cure to the air passageway body.

DEFINITIONS

Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Groove" means an elongated void area in a tread that may extend circumferentially or laterally about the tread in a straight, curved, or zigzag manner. Circumferentially and laterally extending grooves sometimes have common portions. The "groove width" is equal to tread surface area occupied by a groove or groove portion, the width of which is in question, divided by the length of such groove or groove portion; thus, the groove width is its average width over its length. Grooves may be of varying depths in a tire. The depth of a groove may vary around the circumference of the tread, or the depth of one groove may be constant but vary from the depth of another groove in the tire. If such narrow or wide grooves are substantially reduced depth as compared to wide circumferential grooves which the interconnect, they are regarded as forming "tie bars" tending to maintain a rib-like character in tread region involved.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having a shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which:

FIG. 2 is a perspective view of the air tube body component of the air tube sub-assembly;

FIG. 3 is a top perspective view of the inlet cap component of the air tube sub-assembly;

FIG. 3A is a bottom perspective view of the inlet cap component;

FIG. 3B is a cross sectional view through the inlet cap component taken along the line 3B-3B of FIG. 3A;

FIG. 4 is a top perspective view of an inflation device component of the air tube sub-assembly;

FIG. 4A is a bottom perspective view of the inflation device;

FIG. 5 is an exploded perspective view of the air tube sub-assembly.

FIG. 6 is a cross sectional view through the inlet end of the air tube component;

FIG. 7 is a sectional view through inlet end of the air tube component with the cap component assembled thereto;

DETAILED DESCRIPTION OF THE INVENTION

Figure 1:
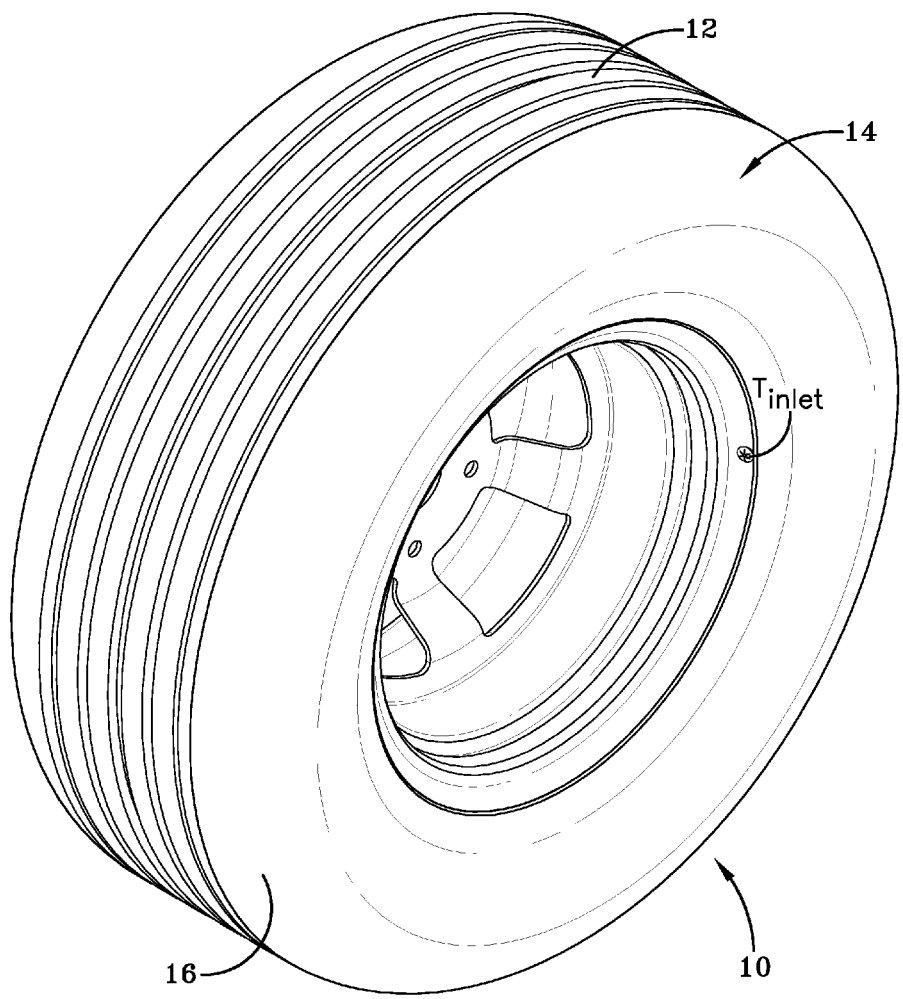
FIG. 1 is a perspective view of the self-inflating tire assembly.
Figure 10:
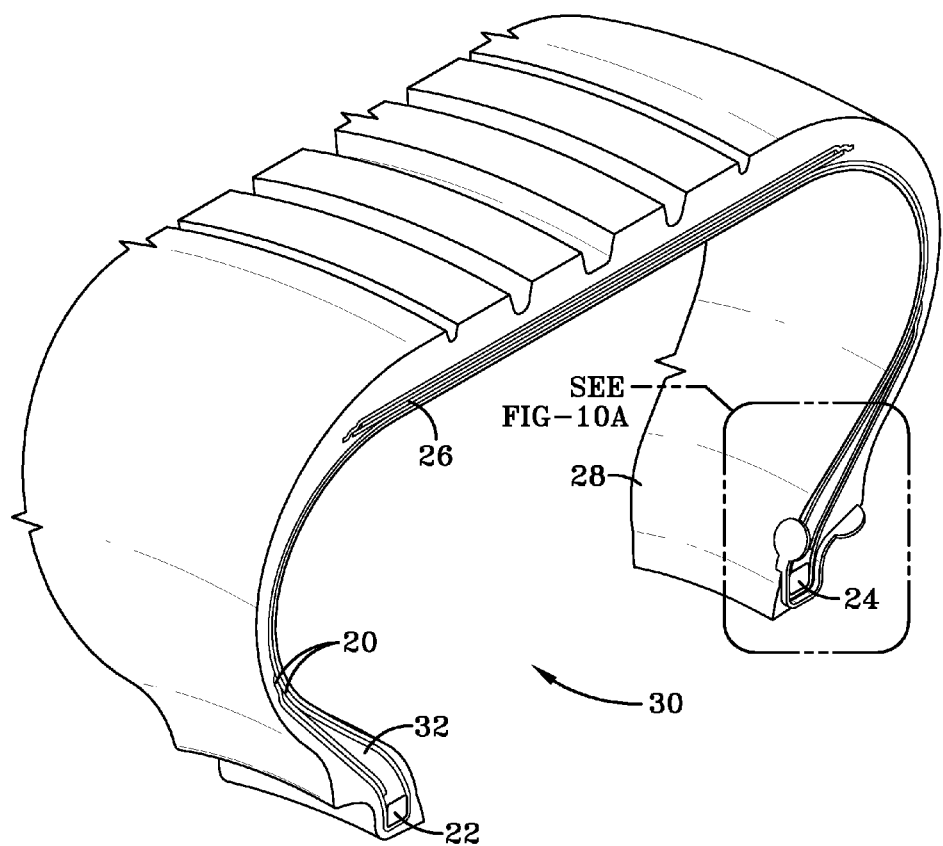
FIG. 10 is an enlarged perspective view of a bead portion of the tire having the alternatively mounted air tube sub-assembly.
Figure 10A:
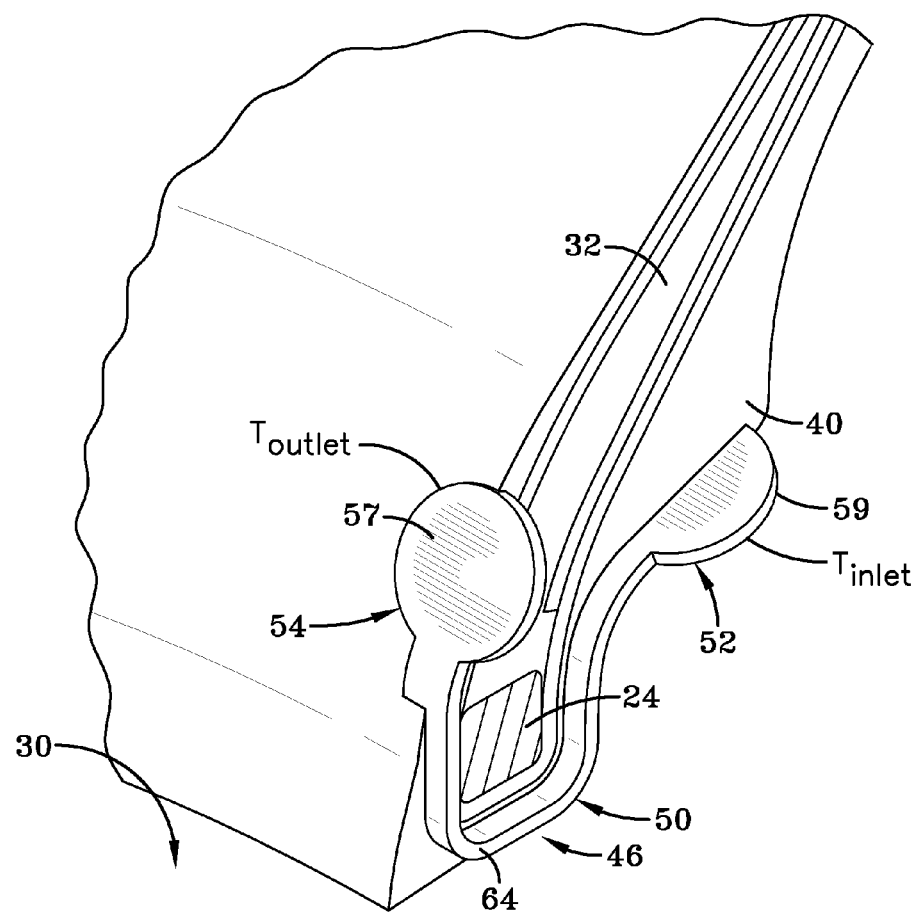
FIG. 10A is an enlarged view of the region of the bead area designated 10A of FIG. 10.

FIGS. 1, 10, and 10A show an example tire 10 for use with the present invention. The tire 10 has a tread 12 and a casing 14. The casing 14 has two sidewalls 16, 18, one or more radial plies 20 extending from, and wrapped about, two annular beads 22, 24 and a belt reinforcement structure 26 located radially between the tread 12 and the ply or plies 20.

The plies 20 and the belt reinforcement structure 26 may be cord reinforced elastomeric material. The cords may be, for example, steel wire filaments and the elastomer may be, for example, a vulcanized rubber material. Similarly, the annular beads 22, 24 may have steel wires wrapped into a bundle forming an inextensible bead core. An innerliner component 28, for example a halobutyl rubber, may form a somewhat air impervious chamber to contain the air pressure within a tire cavity 30 when the tire 10 is inflated.

Figure 11:
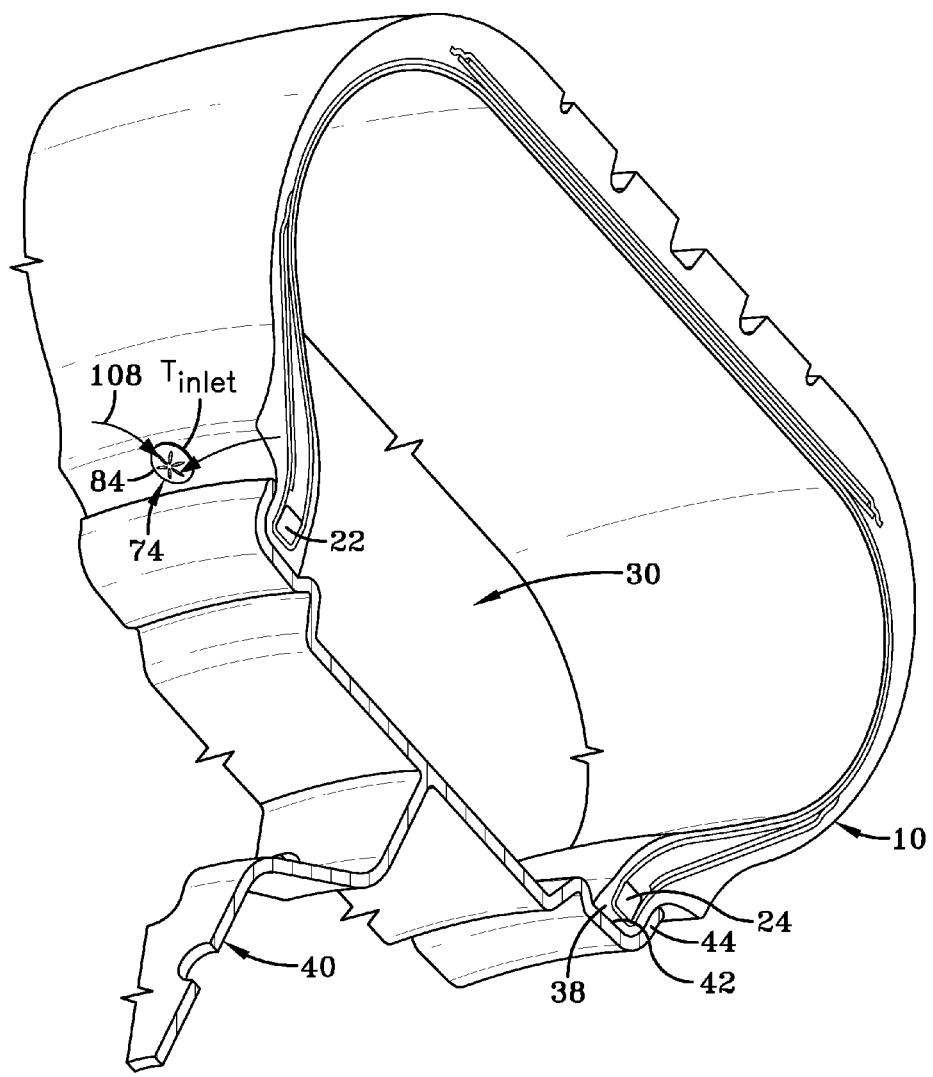
FIG. 11 is a perspective view of a tire underside segment mounted to a rim illustrating the outlet end of the air tube sub-assembly mounted to the tire bead region.
Figure 12:
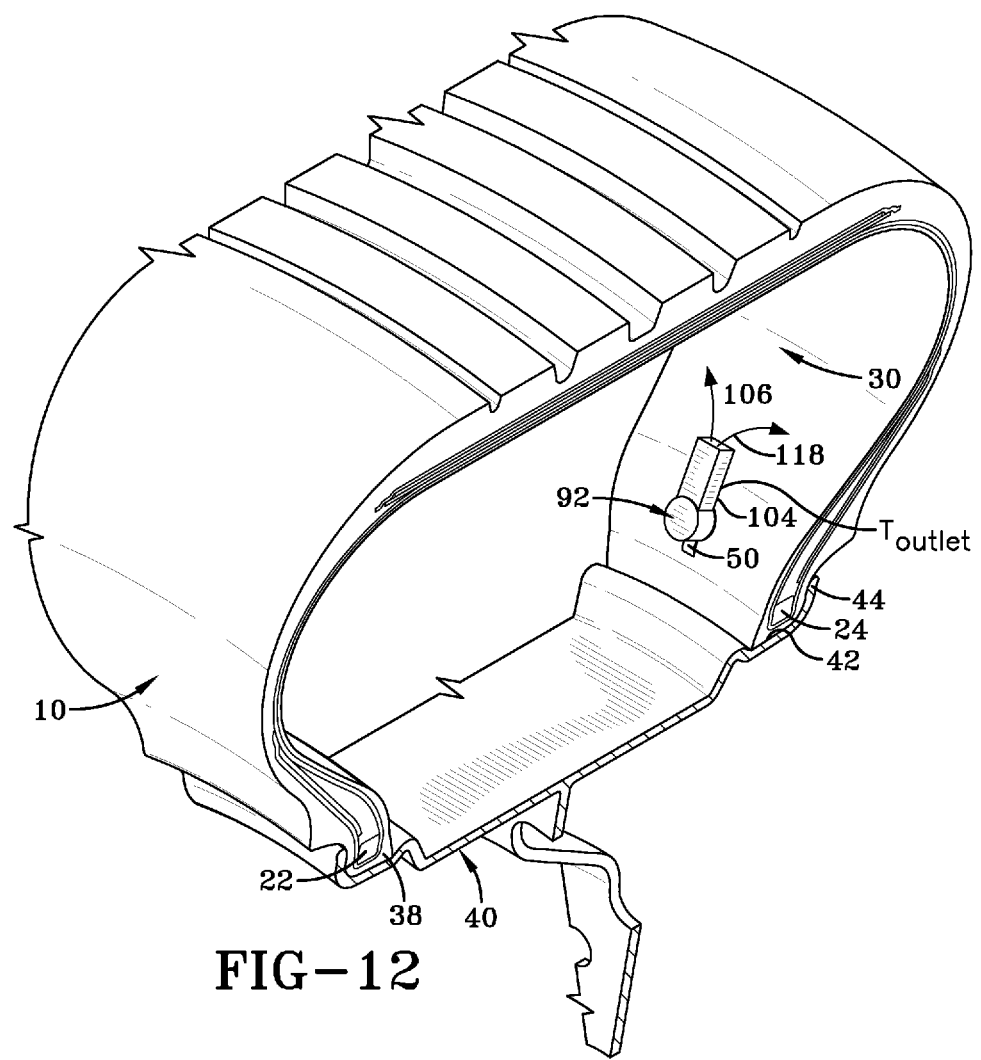
FIG. 12 is a perspective view of a tire topside segment mounted to a rim illustrating the inlet end of the air tube sub-assembly mounted to the bead region.

The tire 10 may further include an elastomeric apex 32 radially disposed above each bead 22, 24. A pair of toe guard turnups 34, 36 are provided that form a chafer cured component 38 (FIG. 9A through D) after the tire has undergone a curing cycle. In general the construction of the tire 10 is conventional and the tire 10 may be configured for consumer, commercial, or specialized vehicle or road applications. As seen in FIGS. 1, 11, and 12, an exemplary cured tire 10 mounts to a rim 40, seated upon rim surface 42 and abutting an outer rim flange 44. So situated, the internal cavity 30 of the tire 10 is enclosed and is intended to contain a recommended volume of air at desired pressure when the tire 10 is fully inflated.

Referring to FIGS. 2, 5, 6, and 7, an air tube body 46 is provided composed of flexible material such as elastomeric or rubber compositions suitable for incorporation into a green tire and capable of maintaining structural integrity during green tire cure. The body 46 is formed having an elongate flat central body section 50 integrally joining at opposite ends to a flattened disk-shaped inlet body end 52 and a flattened disk-shaped outlet body end 54. The body 46 is preferably of unitary construction by conventional molding techniques.

The outlet body end 54 is hollow and of a flat disk-shaped outer configuration having a circular sidewall 56 and a flat outer wall 57. Similarly, the inlet body end 52 at the opposite end of the body central section 50 is likewise of flat disk-shaped outer configuration having a circular sidewall 58 and a flat outer wall 59. As best viewed in FIG. 7, the inlet body end 52 is hollow having an enclosed central air chamber 60. The outlet body end 54 as seen in FIG. 6 is likewise hollow having an enclosed a central air chamber 48. The wall thickness and material composition of the inlet body end 52 and the outlet body end 54 are constructed to facilitate pin penetration from a cap component and inflation device respectively as will be explained.

Figure 8A:
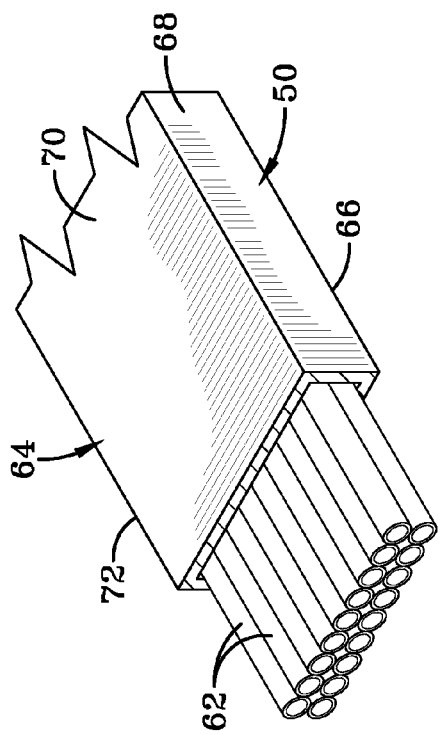
FIG. 8A is a partial perspective view of the air tube showing a plurality of a air passage conduits positioned axially along the tube.
Figure 8B:
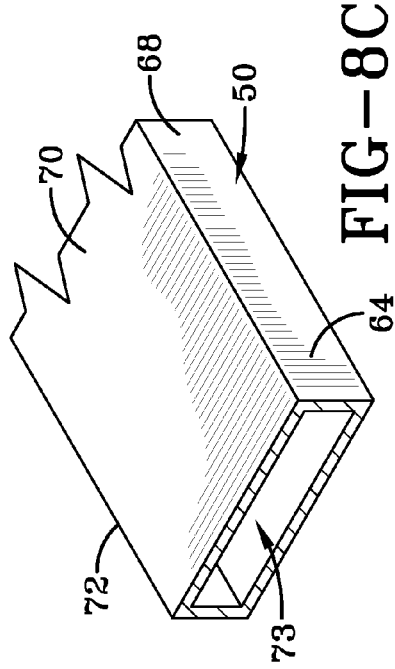
FIG. 8B is a partial perspective view of the air tube showing an alternative number of air passage conduits positioned therein.
Figure 8C:
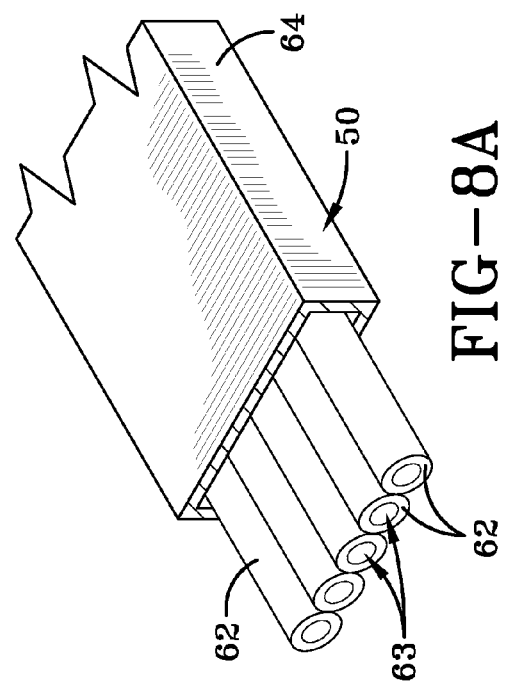
FIG. 8C is a partial perspective view of the air tube showing an alternative configuration in which a central axial passage through the air tube is unobstructed by the presence of air passage conduits.

Referring to FIGS. 6, 7, 8A through 8C, the central body section 50 forms a sheath covering 64 defined by sidewalls 66, 68, 70, 72. An open air passageway 73 as seen in FIG. 8C, in one embodiment, extends between the chamber 60 within inlet body end 52 and the chamber 48 within outlet body end 54. The cross-sectional dimensions of the air passageway 73 is constructed to allow for a free flow of air between the chambers 48 and 60. Alternatively, multiple tubular air cables 62 may be molded within the central body section 50 as shown in FIG. 5, each having an axial air passageway 63 communicating air flow between the chambers 48, 60.

Through appropriate selection of the number and diameter of the air cables 62, the rate of air flow between the chambers 48, 60 may be regulated. For example, FIG. 8A shows an embodiment in which five larger diameter cables 62 are deployed within the central body section 50 and FIG. 8B shows an embodiment utilizing 20 smaller diameter cables 62. Altering the diametric size and number of cables 62 provides flexibility in adjusting the mechanical flex characteristics as well as the air flow characteristics of the air tube body between chambers 48, 60.

Referring to FIGS. 3, 3A, and 3B, a cap component 74 is provided to affix to the inlet body end 52 and allow the flow of air external to a tire into the inlet body end chamber 60. The cap component 74 is constructed of suitable material such as steel or plastic by conventional means into, generally, a dome-shaped cap body 76. The cap body 76 includes a concave top wall 78, a planar bottom wall 80, and an upraised circumferential wall 82 that collectively define an internal cap chamber 86. An array of inlet vents 84 are spaced apart and extend through the concave top wall 78 of the cap body 76. The inlet vents function as air passageways for passing surrounding air through the concave top wall 78 into the cap chamber 86. Projecting from the planar bottom wall 80 is an array of hollow pyramidal pins 88 that taper to a point. Each of the pins 88 has one or more outlet vents or air passageways 90 extending through the body of the pin member to allow air within the cap chamber 86 to evacuate from the cap downward through the pins 88.

As seen from FIGS. 4, 4A, 5, and 13, the air tube subassembly in a post-cure tire includes an inflation device 92 for channeling air from the air tube body 46 into the tire cavity 30. The inflation device 92 has an enclosed cylindrical body 93 defined by body sides 94, a top side 96, and a bottom side 98 that enclose a central chamber 99. Protruding outward from the bottom side 98 is an array of triangular hollow pins 100, each having one or more intake vents extending therethrough to admit air into the central chamber 99. Extending laterally from the cylindrical body 93 is an elongate conduit 104 having a central air passageway 108 extending axially therethrough to an open end 108. The conduit 104 is generally of flat configuration, rectangular in section and having a planar top wall 110, a planar bottom wall 112, and relatively low profile side walls 114. The direction of the conduit 104 is generally transverse to the direction of air flow through the pins 100 and into the chamber 99. The central air passageway 106 through conduit 104 connects into the chamber 99. A flow of air upward through the pins 100 in the direction 118 enters the chamber 99 and is routed therefrom through the conduit 104 as shown by arrow 116 of FIG. 13 and exits as shown by arrow 118 at conduit end 108. The device 92 may be formed by conventional means by suitable material such as plastic or steel.

Referring to FIGS. 9A through D, 10, and 10A, it will be seen that in the embodiment shown, the air tube body 46 is intended to be incorporated into a green tire during the green tire build process. The air tube body 46 is manufactured as a separate component and, at the appropriate stage of green tire build, integrated between standard tire components so that the inlet body end 52 is situated and faces outward external to the tire, and the outlet body end 54 is situated and faces inward toward the cavity 30 of the tire. In the configuration shown, body 46 is positioned and sandwiched between overlapping two toe guard turnup components 34, 36 although other configurations for integrating the air tube body 46 into a green tire may be employed if so desired. The turnup components 34, 36 will become the chafer component in the cured tire.

Figure 9A:
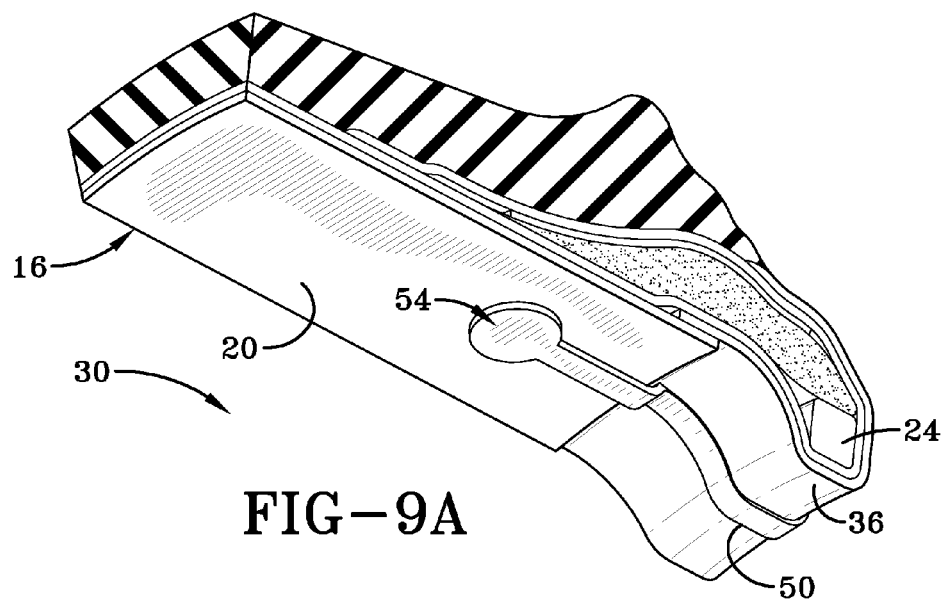
FIG. 9A is an enlarged underside perspective view shown in partial section of the bead region of a tire incorporating an externally mounted the air tube sub-assembly.

The integration of the air tube body 46 between the green tire components 34, 36 is shown in sequence and detail by FIGS. 9A through D. FIG. 9A shows the placement of turnup component 36 around the tire bead 24 and the placement of the air tube body 46 over the component 36. So positioned, the air tube body 46 likewise surrounds the tire bead 24 with the outlet end 54 facing toward the tire cavity 30. The flat construction of the air tube body 46 with the elastomeric and flexible choice of materials in the formation of the body allows the air tube body 46 to resiliently conform to follow the shape of the turnup component 36 and lie flat thereagainst. Embedding the air tube component 36 in such a position as shown does not compromise or alter the position or structure of any of the green tire components assembled prior or subsequent to the positioning of the air tube body 36.

Figure 9B:
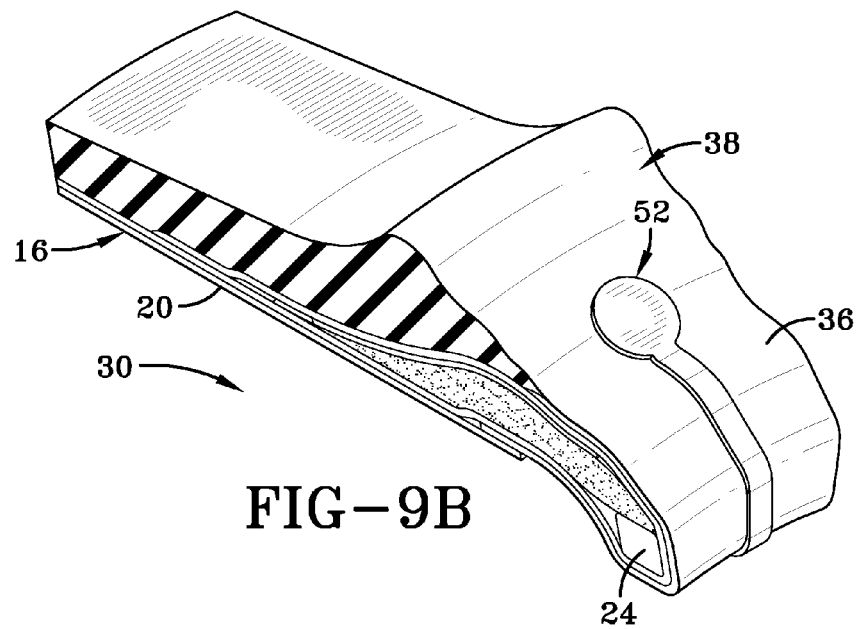
FIG. 9B is an enlarged topside perspective view shown in partial section of the bead region incorporating the externally mounted air tube sub-assembly.
Figure 9C:
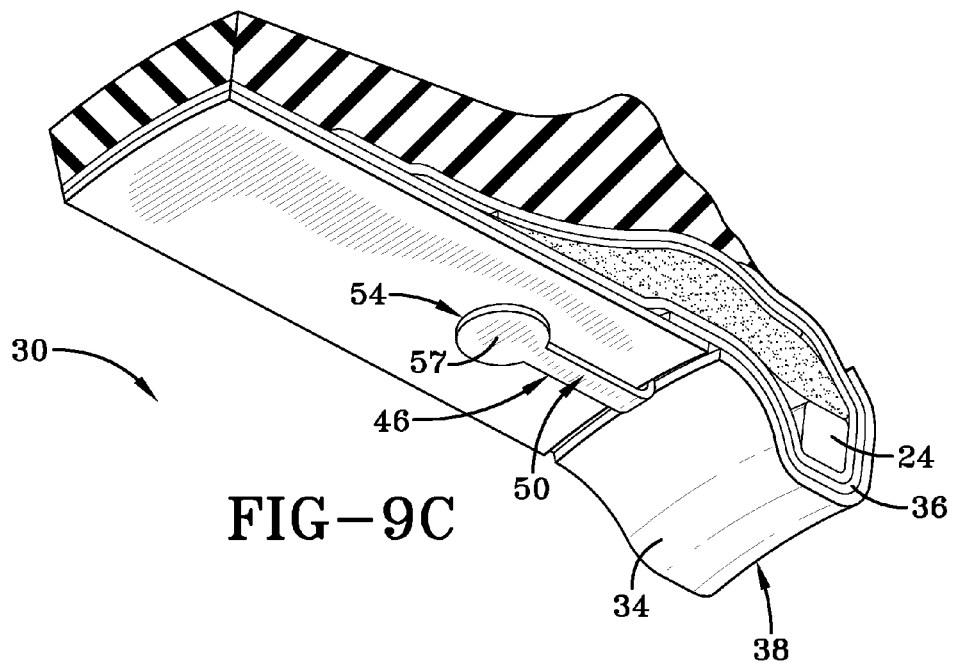
FIG. 9C is an enlarged underside perspective view shown in partial section of the bead region of a tire in an alternative construction in which the air tube sub-assembly is integrated into the tire construction.
Figure 9D:
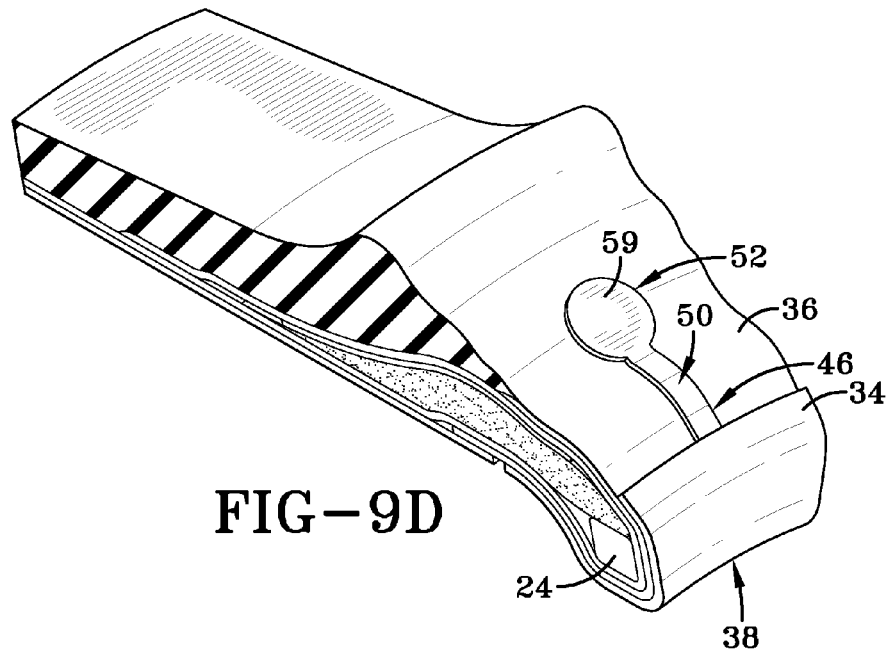
FIG. 9D is an enlarged top side view of the alternative construction of FIG. 9C.

FIG. 9B shows a view of the outside of the green tire and, specifically, the location of the air inlet body end 52 of the air tube body 46. The inlet body end 52 lies flat against the outside of the component 36 and faces outward from the green tire. In FIGS. 9C and 9D, placement of the outer second toe guard turnup component 34 is shown, overlapping air tube body 46 and sandwiching the air tube body 46 between the components 34, 36. The flat, low profile construction of the air tube body 46, particularly the central body segment 50, allows the component 34 to be fitted around the bead core 24 and flat over the inward turnup component 36 in the manner customary to green tire build without compromising the relative positioning or structure of any green tire component. As shown, after the component 34 is positioned over the component 36 and the air tube body 36, the outlet end 54 of the body 36 remains exposed to, accessible from, and facing the tire cavity 30 and the inlet end 52 of the body 36 remains exposed to, accessible from, and facing the outside of the green tire for a purpose explained below.

FIGS. 10 and 10A illustrate a section view through the completed green tire. As best seen in the enlarged sectional view of FIG. 10A, the flat outward surface 57 outlet end 54 faces the interior cavity 30 of the green tire while the flat outward surface 59 of inlet end 52 faces outward from the tire. The central body 50 of the air tube body 46 is encased between the toe guard components 34, 36 and surrounds the tire bead 22. The air tube body 46 within the green tire is enclosed, containing the air passageway through the central body 50 and the chambers 48, 60 within the ends 52, 54. The green tire is then subjected to a curing cycle in conventional manner resulting in a finished tire.

Subsequent to tire cure, as illustrated by FIGS. 5, 6, 7, 11, and 12, the cap component 74 is affixed to the outward surface 59 of the inlet end 52 of air tube body 46. The hollow tapering pins 88 of the cap 74 penetrate through surface 59 until the pin openings 90 enter the inlet end chamber 60. The sectional thickness and material selection of inlet end 52 are designed to facilitate penetration by the cap member pins 88. The pins 88 are constructed of suitably hard material to penetrate through the thickness of the inlet end surface 59 as required. Frictional engagement of the pins 88 through surface 59 acts to retain the cap 74 in place upon the inlet end 52 of the air tube body 46. Secondary retention assist may be included if desired, such as the application of an adhesive between the cap 74 and the inlet surface 59. The surface area and geometry of the underside of the cap generally complements the surface area and geometry of the surface 59 but need not necessarily do so. So positioned, an inlet air path is defined through the vent openings 84 of the cap 74, through the hollow pins 88 of the cap 74, through the openings 90 at the outer tapered ends of the pins 88, and into the inlet end 52 of the air tube body 46 as indicated by directional arrows 108.

The outlet end 54 of the air tube body 46 is fitted with the inflation device 92 in a post tire-cure operation as shown. The hollow tapering pins 100 of the device 92 penetrate through surface 57 until the pin openings 102 enter the outlet end chamber 48. The sectional thickness and material selection of outlet end 52 are designed to facilitate penetration by the device pins 100. The pins 100 are constructed of suitably hard material to penetrate through the thickness of the outlet end surface 57 as required. Frictional engagement of the pins 100 through surface 57 acts to retain the device 92 in place upon the outlet end 5 of the air tube body 46. Secondary retention assist may be included if desired, such as the application of an adhesive between the device 92 and the outlet end surface 57. The surface area and geometry of the underside 98 of the device 92 generally complements the surface area and geometry of the surface 57 but need not necessarily do so. So positioned, an outlet air path is defined through the passageway 106 of the outlet conduit 104 from the hollow pins 102 of the device 92 which communicate through pin openings 102 with the inner chamber 48 of the outlet end 54 as indicated by directional arrows 118 of FIGS. 12 and 13.

As explained previously, the central body 50 of the air tube body 46 may constitute an open channel between the inlet chamber 60 and the outlet chamber 48. Alternatively, one or more tubular air cables 62 may be embedded within the central body 50 so as to extend between the chambers 48, 60. The number and cross-sectional dimension of the passageways 63 through cables 62 may be selected to enable air to flow between the chambers 48, 60 at a preferred rate. It will be appreciated from FIG. 12 that the outlet conduit 104 of the device 92 extends at a right angle to the path of air moving from the outlet end 54 into the pins 102. Air escaping the outlet conduit 104 is thereby injected into the tire cavity 30 along the inner surface of the sidewall as shown by arrows 118. The orientation of the conduit 104 along the inner surface of the sidewall and into the cavity 30 reduces the extent to which the conduit 104 protrudes into the cavity 30 and thereby minimizes the risk of breakage.

From the foregoing, it will be appreciated that the air passage through the air tube body 46 is entirely enclosed during incorporation of the body within a green tire. The integration of the body 46 within the green tire is done during conventional tire construction techniques and does not require specialized equipment. Moreover, the integration of the body 46 within a green tire establishes a channel that will let air in the tire cavity 30 when needed but which does not compromise the existing tire component configuration and placement or tire attributes such as durability and air containment.

The system provides the advantage of enabling an embedding of an air passage into a tire that does not result in a disruption to the tire building and curing process; does not require any drilling of the cured tire and, therefore, will have a relatively low impact on tire durability; is modular and therefore offers flexibility for use on different tires within product lines.

The shape of the cap 74, the air tube body 46, and the inflation device 92 shown and described previously allows air in from outside the tire and passes the air through the tire by means of the air tube body 46. The cap 74 and the inflation device 92 are not pinched to the enclosed air tube body 46 until after tire cure, whereby preventing the flow of rubber into the air tube body during tire cure. The optional use of discrete tubular air cables 62 within the air tube body central body 50 allows for air flow control as well as a more sturdy body 50 construction capable of withstanding the flexing that occurs within a tire during normal use.

Figure 13:
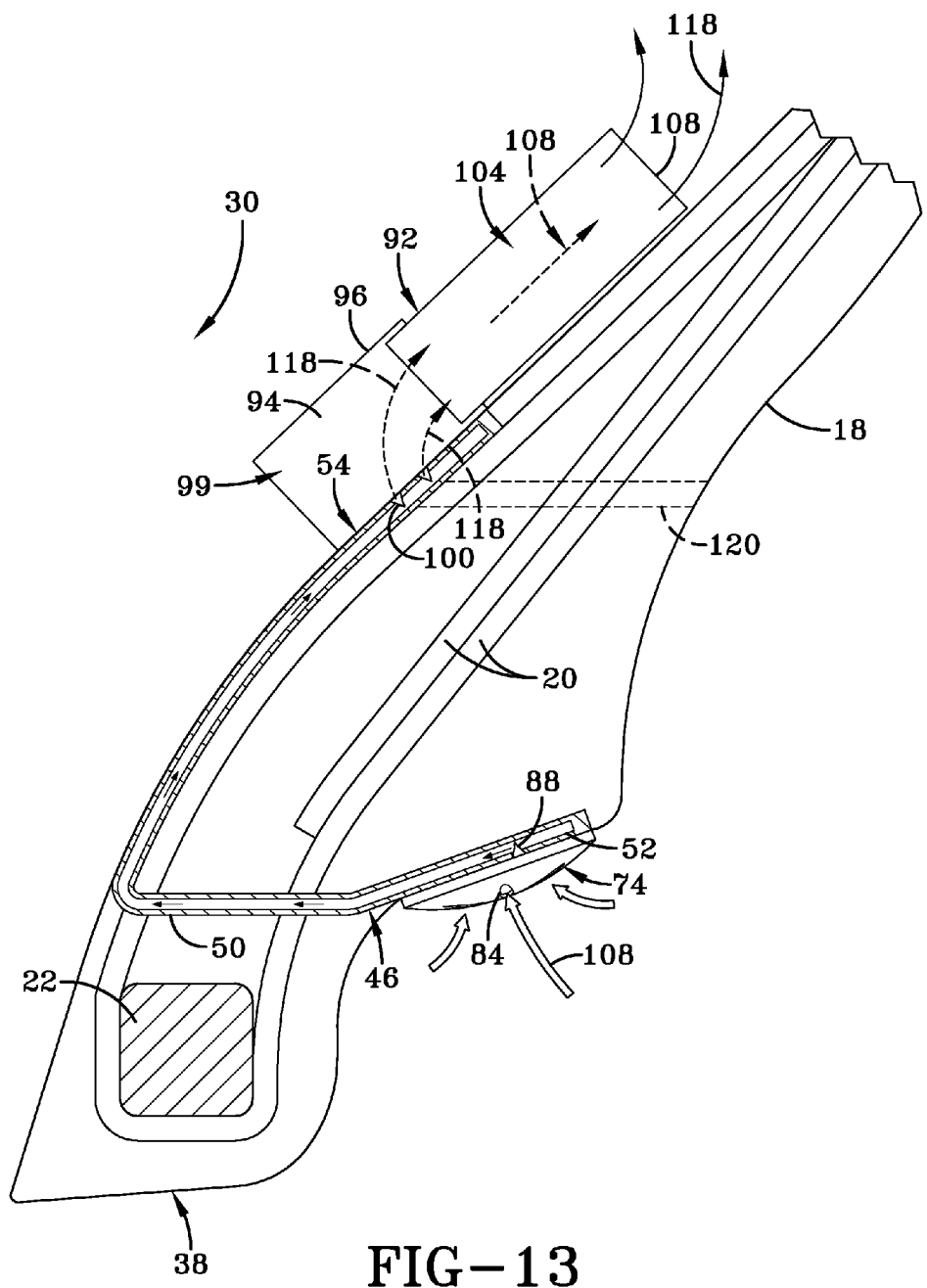
FIG. 13 is a sectional view through a tire having an alternatively configured and routed air tube sub-assembly incorporated therein.

FIG. 13 illustrates an alternative embodiment in which the air tube body 46 is not routed around the tire bead. The air tube body 46 in FIG. 13 extends through the tire above the bead 22 and along the inner wall of the tire sidewall facing the cavity 30. As with the embodiment of FIGS. 1 through 12, the inflation device 92 pinches into an outlet end 54 of the air tube body 56 while a cap component 74 penetrates into and attaches to an inlet end. Another position that may be used is shown in phantom in FIG. 13 at numeral 120. At position 120, the air tube body would be extend along a linear path through the tire between the inflation device 92 and the cap 74. In either of the alternative embodiments, a passage through the tire may be drilled once the tire is cured for receipt of the air tube body 46. The advantage gained is a shorter path for the air flow, therefore reducing air flow pressure losses. The alternatives of FIG. 13, however, could create durability issues due to stress concentrations. Moreover, since the size of the hole for receipt of the air tube body may be approximately 5 mm., one or more carcass fibers may be severed. In addition, the off-line drilling after curing may add cost to the manufacturing process.

The tire body is constructed from a pre-cure green tire carcass form cured to a post-cure finished tire body form.

It will be appreciated from the foregoing that, in a general sense, the air tube body 46 (also referred to herein interchangeably as an "air passageway body") resides within the tire body 10 and extends between an outward facing tire body surface such as the outer surface of the chafer 38 and the tire cavity 30. The path of FIGS. 1 through 12 may be employed or alternative paths such as, but not limited to, the alternative paths of FIG. 13. The air passageway body 46 provides the enclosed air passageway (chambers 48, 60 with the air cable(s) 62) which extends between the hollow body outlet end 54 facing the tire cavity 30 and the hollow inlet end 52 facing outward from the outward facing tire body surface. The cap 74 and the inflation device 92 represent tapping devices affixed over one or both of the ends of the air passageway body 46. Each tapping device(s) 74, 92 includes an external vent opening and a protrusion pin member (88, 100) penetrating through a sidewall of the air passageway body 46 to operatively establish an air flow path extending between the air passageway of the air passageway body through the protrusion pin member and through the tapping device vent opening. The "inlet tapping device" (cap 74) is affixed over the hollow body inlet end 52 to operatively direct "outside" air flow into the air passageway of the air passageway body while the "outlet tapping device" (inflation device 92) is affixed over the hollow body outlet end 54 to operatively direct air flow from the air passageway of the air passageway body into the tire cavity 30. The assembly of the air passageway assembly to the tire is done in separate stages, beginning with incorporation of the air passageway tube 46 into a pre-cure green tire carcass form of the tire so that ends of the air passageway tube 46 are at least partially exposed and concluding with the post-cure attachment of cap 74 and/or inflation device 92 to the air tube body 46.

It will be noted from FIGS. 1 through 12 that pre-cure integration of the air passage body 46 into the green tire carcass form of the tire achieves significant advantage. The air tube body 46 is enclosed which keeps the air passageway clear during tire cure. The position and configuration of the air tube body is such that components of the tire are not compromised or structurally affected by the integration of the air passage into the green tire. Thereafter, the cap and inflation device are added if a self inflation capability is desired. The cap and inflation device are affixed by penetrating respective inlet and outlet ends of the air tube body 46 by hollow tapered pins, whereby allowing air to flow into the cap over the inlet end, through the air tube body, and out of the inflation device over the outlet end. The system thus provides an air passage through two hollow ends of a air passageway tube that is pre-installed into a green tire prior to cure. The method of integrating the air channel into the assembly of the tire before curing and only piercing the air passage hollow ends after tire cure serves to keep the air passageway unobstructed and clear. Moreover, the arrangement of tubular cables inside the air tube body central body provides enhanced structural integrity for the passage of air and allows for a control of air flow rate by selecting the number and size of the hollow passageway cables.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A tire assembly comprising:
a tire body having a tire cavity between first and second sidewalls that extend respectively from a pair of annular tire core bead cores to a tire tread region, the tire body constructed from a pre-cure green tire carcass formed into a cured a post-cure finished tire body form;
an air passageway body within the tire body and extending between an outward facing tire body surface and the tire cavity, the air passageway body having an enclosed air passageway extending between a hollow body outlet end facing the tire cavity and a hollow inlet end facing outward from the outward facing tire body surface;
at least one tapping device affixed over at least one of the ends of the air passageway body, the at least one device having an external vent opening and a protrusion member penetrating through a sidewall of the air passageway body to operatively establish an air flow path extending between the air passageway of the air passageway body through the protrusion member and the tapping device vent opening.

2. The tire assembly of claim 1, wherein the at least one tapping device comprises an inlet tapping device affixed over the hollow body inlet end to operatively direct air flow into the air passageway of the air passageway body and an outlet tapping device affixed over the hollow body outlet end to operatively direct air flow from the air passageway of the air passageway body into the tire cavity.

3. The tire assembly of claim 1, wherein the air passageway body is installed pre-cure within the pre-cure green tire carcass form of the tire body.

4. The tire assembly of claim 3, wherein the at least one device is affixed post-cure to the air passageway body within the post-cure finished tire body form.

5. The tire assembly of claim 4, wherein the at least one tapping device comprises an inlet tapping device affixed over the hollow body inlet end to operatively direct air flow into the air passageway of the air passageway body and an outlet tapping device affixed over the hollow body outlet end to operatively direct air flow from the air passageway of the air passageway body into the tire cavity.

6. The tire assembly of claim 1, wherein the at least one tapping device comprises a cap device affixed over the hollow inlet end of the air passageway body, the cap device comprising: an internal cap chamber at least partially defined by an outward facing cap side and an inward facing cap underside; at least one vent opening within the outward facing cap side and communicating with the cap chamber; and at least one hollow pin protrusion extending from the cap underside through one sidewall of the hollow inlet end of the air passageway body, the pin protrusion having an internal pin air passage communicating with the cap chamber and at least one pin outlet opening positioned within the air passage of the air passageway body.

7. The tire assembly of claim 6, wherein the pin protrusion tapers inward toward a tapered end portion positioned within the air passage of the air passageway body, and the at least one pin outlet opening is located within the tapered end portion of the pin protrusion within the air passage of the air passageway body.

8. The tire assembly of claim 7, wherein the tapered end portion of the pin protrusion operatively penetrates through the one sidewall of the hollow inlet end of the air passageway body to connect the cap device to the air passageway body.

9. The tire assembly of claim 8, wherein the air passageway body is assembled pre-cure within the pre-cure green tire carcass form of the tire body.

10. The tire assembly of claim 9, wherein the cap device is affixed post-cure to the air passageway body within the post-cure finished tire body form of the tire body.

11. The tire assembly of claim 1, wherein the at least one tapping device comprises an inflation device affixed over the hollow outlet end of the air passageway body, the inflation device comprising: an internal inflation device chamber at least partially defined by an outward inflation device side and an inward facing inflation device underside; at least one outlet opening within the outward inflation device side and communicating with the inflation device chamber; and at least one hollow pin protrusion extending from the inflation device underside through one sidewall of the hollow outlet end of the air passageway body, the pin protrusion having an internal pin air passage communicating with the inflation device chamber and at least one pin outlet opening between the pin air passage and the air passage of the air passageway body.

12. The tire assembly of claim 11, wherein the inflation device pin protrusion tapers inward toward a tapered end portion positioned within the air passage of the air passageway body, and the at least one pin outlet opening is located within the tapered end portion of the pin protrusion within the air passage of the air passageway body.

13. The tire assembly of claim 12, wherein the tapered end portion of the pin protrusion is operatively configured to penetrate through the one sidewall of the hollow outlet end of the air passageway body to connect the inflation device to the air passageway body.

14. The tire assembly of claim 13, wherein the air passageway body is assembled pre-cure to the pre-cure green tire carcass form of the tire body and the inflation device is affixed post-cure to the air passageway body within the post-cure finished tire form of the tire body.

15. The tire assembly of claim 1, wherein the at least one tapping device comprises an inlet tapping device affixed over the hollow body inlet end to operatively direct air flow into the air passageway of the air passageway body and an outlet tapping device affixed over the hollow body outlet end to operatively direct air flow from the air passageway of the air passageway body into the tire cavity, and wherein the inlet tapping device and the outlet tapping device each having at least one pin protrusion tapering inward toward a tapered end portion and positioned within respective ends of the air passage of the air passageway body, and wherein the at least one pin outlet opening within each pin protrusion is located within the respective tapered pin end portion and resides within the respective end of the air passage of the air passageway body.

16. The tire assembly of claim 15, wherein the inlet tapping device and the outlet tapping device are affixed post-cure to the air passageway body and the air passageway body is assembled pre-cure to the pre-cure green tire carcass form of the tire body.

17. The tire assembly of claim 16, wherein the air passageway follows a non-linear path between an outward tire body surface and the inward tire body surface.

18. The tire assembly of claim 17, wherein the air passageway body path at least partially surrounds a first tire body bead core.

19. The tire assembly of claim 18, wherein the air passageway body is positioned between first and second tire turnup chafer components of the pre-cure green tire carcass.

* * * * *